US008907941B2

(12) United States Patent
Gay et al.

(10) Patent No.: US 8,907,941 B2
(45) Date of Patent: Dec. 9, 2014

(54) SYSTEM AND METHOD FOR INTEGRATING MULTIPLE VIRTUAL RENDERING SYSTEMS TO PROVIDE AN AUGMENTED REALITY

(75) Inventors: Michael Gay, Collinsville, CT (US); Aaron Thiel, Durham, CT (US)

(73) Assignee: Disney Enterprises, Inc., Burbank, CA (US)

( * ) Notice: Subject to any disclaimer, the term of this patent is extended or adjusted under 35 U.S.C. 154(b) by 613 days.

(21) Appl. No.: 12/456,780

(22) Filed: Jun. 23, 2009

(65) Prior Publication Data
US 2010/0321377 A1 Dec. 23, 2010

(51) Int. Cl.
*G06T 15/00* (2011.01)
*G06T 11/00* (2006.01)
*G06T 19/00* (2011.01)

(52) U.S. Cl.
CPC ............... *G06T 19/00* (2013.01); *G06T 11/00* (2013.01)
USPC ........................................................ 345/419

(58) Field of Classification Search
CPC .... G06T 15/20; G06T 1/00; H04N 21/21805; H04N 21/23418; H04N 21/44016; H04N 5/265
USPC ................................. 345/418, 633, 632, 419
See application file for complete search history.

(56) References Cited

U.S. PATENT DOCUMENTS

| | | | |
|---|---|---|---|
| 6,154,250 A * | 11/2000 | Honey et al. | 348/157 |
| 6,229,550 B1 * | 5/2001 | Gloudemans et al. | 345/641 |
| 6,924,807 B2 * | 8/2005 | Ebihara et al. | 345/503 |
| 2004/0102245 A1 * | 5/2004 | Escalera et al. | 463/32 |
| 2007/0132785 A1 * | 6/2007 | Ebersole et al. | 345/633 |
| 2007/0146372 A1 * | 6/2007 | Gee et al. | 345/474 |
| 2008/0079752 A1 * | 4/2008 | Gates et al. | 345/633 |
| 2009/0221368 A1 * | 9/2009 | Yen et al. | 463/32 |
| 2011/0164116 A1 * | 7/2011 | Gay et al. | 348/47 |

* cited by examiner

*Primary Examiner* — Kee M Tung
*Assistant Examiner* — Haixia Du
(74) *Attorney, Agent, or Firm* — Farjami & Farjami LLP

(57) ABSTRACT

There is provided a system and method for integrating multiple virtual rendering systems to provide an augmented reality. There is provided a method for integrating multiple virtual rendering systems for outputting a composite render to a display, comprising obtaining a first environment data from a first virtual rendering system using a first camera view, obtaining a second environment data from a second virtual rendering system using a second camera view, rendering the composite render by processing the first environment and the second environment, and outputting the composite render to the display. Additionally, the first environment data and second environment data may depend on synchronized or corresponding inputs, and display priority algorithms or masking algorithms may be used to determine virtual and real object display priority.

18 Claims, 4 Drawing Sheets

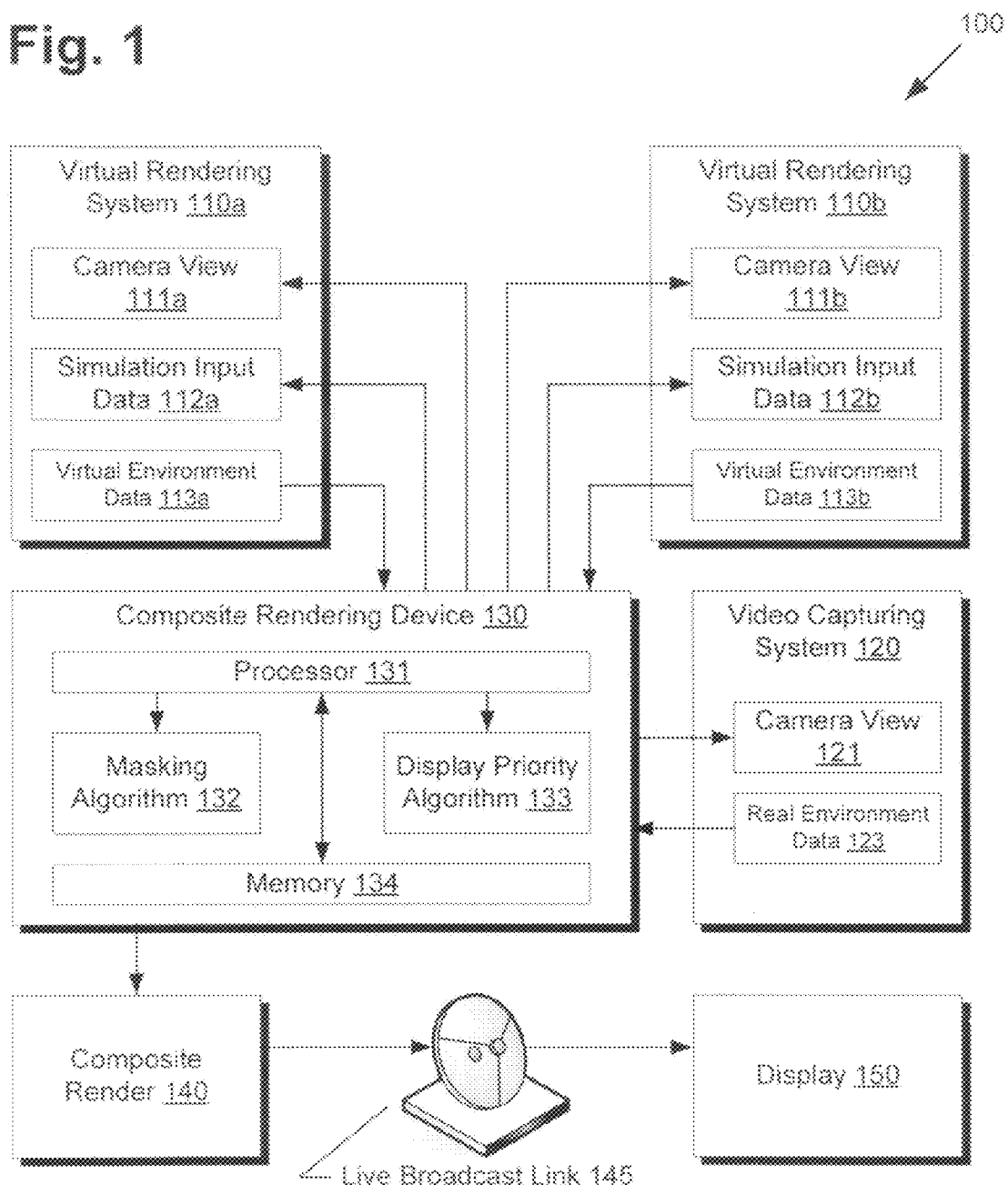

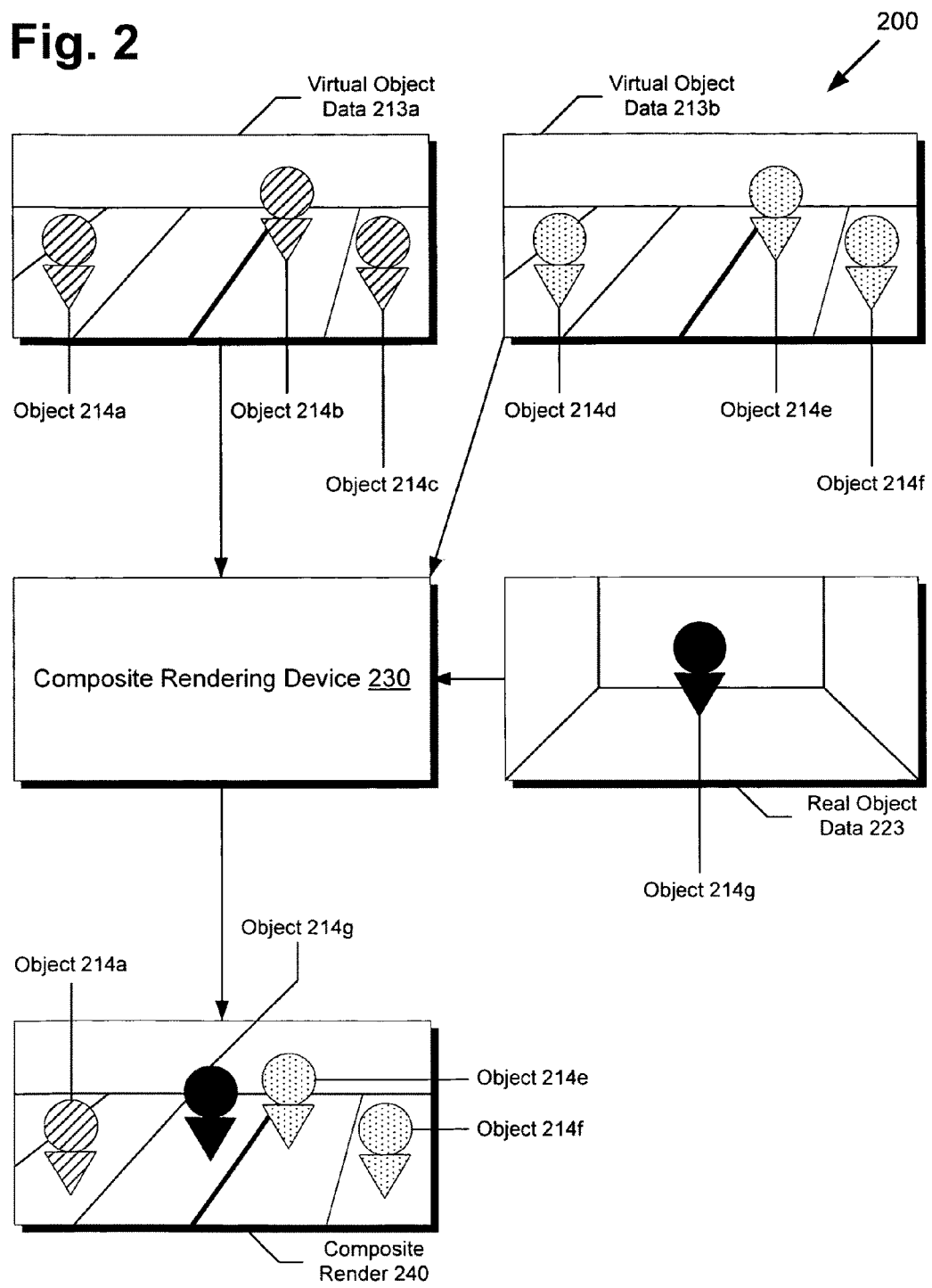

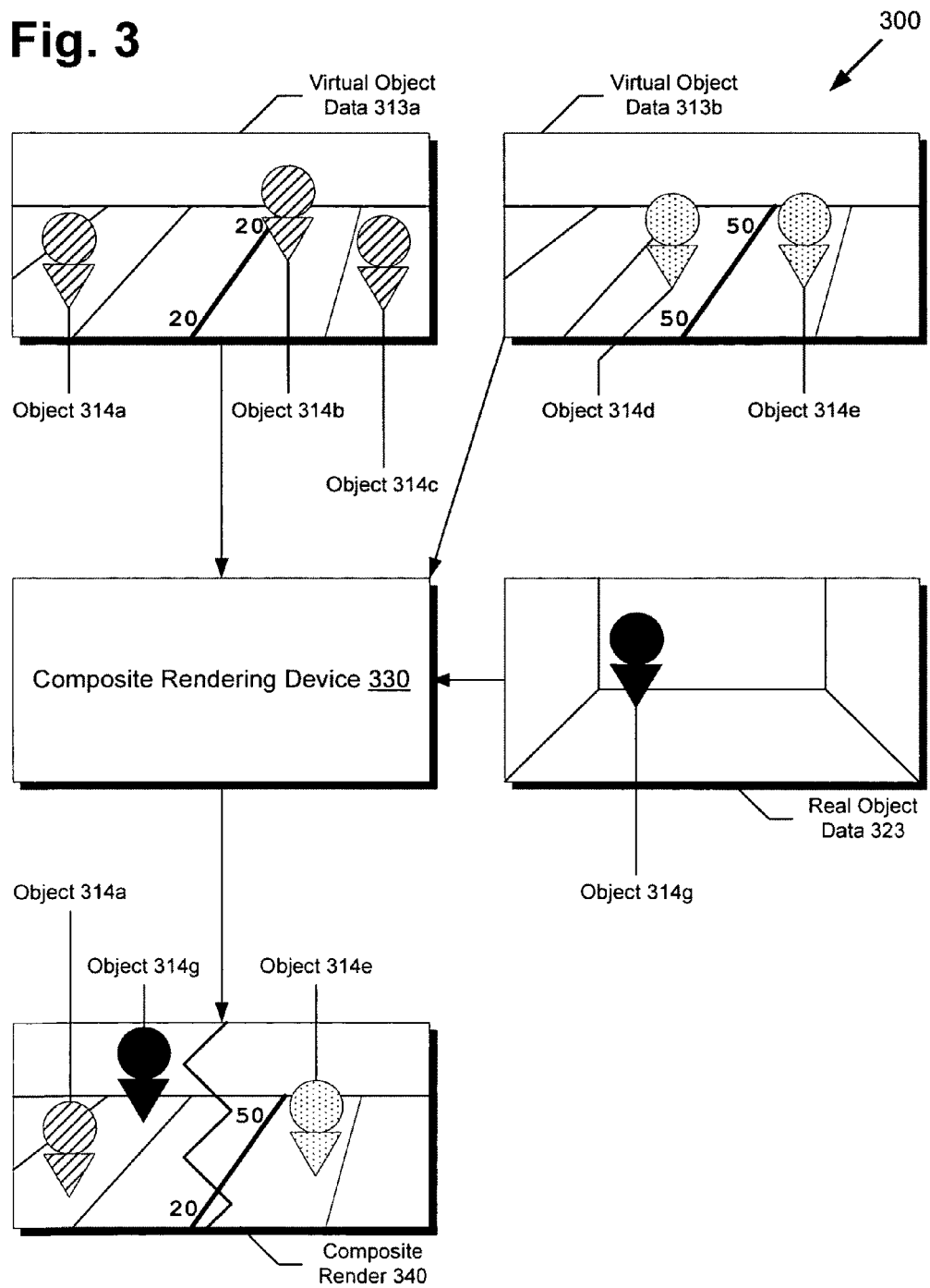

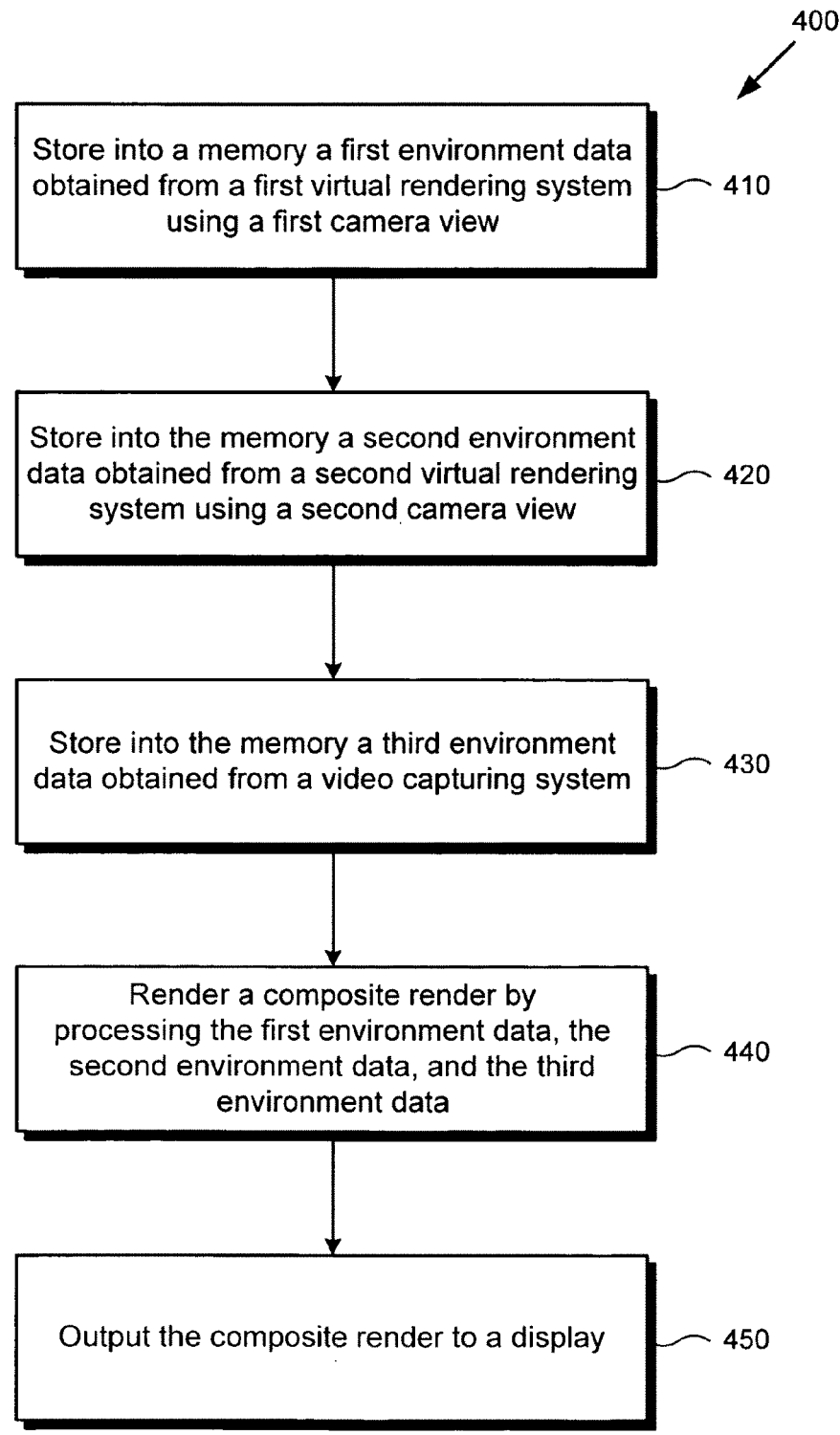

SYSTEM AND METHOD FOR INTEGRATING MULTIPLE VIRTUAL RENDERING SYSTEMS TO PROVIDE AN AUGMENTED REALITY

BACKGROUND OF THE INVENTION

1. Field of the Invention

The present invention relates generally to digital video. More particularly, the present invention relates to digital video rendering.

2. Background Art

Sports are widely watched and enjoyed by many people, from dedicated sports fans to casual spectators. While just watching the game or match by itself is already exciting, the addition of virtual contents, such as alternative or substitute player rendering, strategy simulations, alternative viewpoints, and other effects may deepen viewer appreciation and understanding of the game. With the advanced game analysis capabilities provided by these virtual contents, viewers can enjoy rich multimedia experiences with customized virtual contents. Additionally, by using video capture to supplement the virtual contents, "augmented reality" can be presented to the user with both virtual and real contents displayed seamlessly. This can be used to introduce, for example, a human navigator or commentator to point out and explain onscreen virtual contents of interest.

Traditionally, a virtual renderer is used to provide such virtual contents. While this method may suffice for simplistic renderings, this conventional approach lacks scalability and poses implementation problems for more advanced and complex rendering simulations. Improving such a virtual renderer to handle the demands of advanced rendering simulations is an arduous task requiring unreasonable amounts of development time and resources. Therefore, the traditional monolithic rendering model has proven to be less suitable for accommodating advanced rendering simulations, has provided a less than optimal viewing experience for viewers and has posed a difficult development hurdle for producers.

Accordingly, there is a need to overcome the drawbacks and deficiencies in the art by providing a way to present virtual contents supporting advanced simulations in a manageable and scalable manner.

SUMMARY OF THE INVENTION

There are provided systems and methods for integrating multiple virtual rendering systems integration to provide an augmented reality, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 presents a system for integrating multiple virtual rendering systems to provide an augmented reality, according to one embodiment of the present invention;

FIG. 2 presents a diagram of real and virtual environments for use by a system for integrating multiple virtual rendering systems to provide an augmented reality using the same camera view, according to one embodiment of the present invention;

FIG. 3 presents a diagram of real and virtual environments for use by a system for integrating multiple virtual rendering systems to provide an augmented reality using different camera views, according to one embodiment of the present invention;

FIG. 4 shows a flowchart describing the steps, according to one embodiment of the present invention, by which a rendering device can render multiple virtual rendering systems in a displayable environment.

DETAILED DESCRIPTION OF THE INVENTION

The present application is directed to a system and method for integrating multiple virtual rendering systems to provide an augmented reality. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

FIG. 1 presents a system for integrating multiple virtual rendering systems to provide an augmented reality, according to one embodiment of the present invention. Network system 100 of FIG. 1 includes virtual rendering systems 110a-110b, video capturing system 120, composite rendering device 130, composite render 140, live broadcast link 145, and display 150. Virtual rendering system 110a includes camera view 111a, simulation input data 112a, and virtual environment data 113a. Virtual rendering system 110b includes camera view 111b, simulation input data 112b, and virtual environment data 113b. Video capturing system 120 includes camera view 121 and real environment data 123. Composite rendering device 130 includes processor 131, masking algorithm 132, display priority algorithm 133, and memory 134.

Virtual rendering system 110a may comprise, for example, a personal computer using standard off-the-shelf components, or a videogame console. Virtual rendering system 110a may then execute a customized simulation program for simulating a virtual environment according to simulation input data 112a. As shown in FIG. 1, simulation input data 112a is provided by composite rendering device 130; however, alternative embodiments may provide input data 112a from other sources. For example, simulation input data 112a may be provided by a keyboard, mouse, game-pad, or another input device connected directly to virtual rendering system 110a or composite rendering device 130, or may be provided remotely though a network. Once virtual rendering system 110a processes simulation input data 112a, then virtual environment data 113a may be produced, providing a detailed snapshot of object data and other parameters within the simulated virtual environment. As the simulation progresses, new data may be used from simulation input data 112a, leading to updated values within virtual environment data 113a. Composite rendering device 130 may continuously read updated values from virtual environment data 113a, or may periodically poll virtual environment data 113a. For example, to accommodate a 30 frames per second rate, virtual environment data 113a may be updated and read at least 30 or more times per second, including object data and other environmental conditions.

Virtual environment data 113a may contain various environmental data to represent a virtual three-dimensional world such as world settings, three-dimensional models and object data, spatial positioning, textures, behaviors, properties, and other data. Spatial positioning values for virtual environment data 113a might be formatted using absolute values or by using values relative to camera view 111a, which is provided by composite rendering device 130 in FIG. 1. Virtual environment data 113a may also include a pre-rendered displayable version of the virtual three-dimensional world as defined by camera view 111a and the data within virtual environment data 113a. This displayable version may, for example, comprise a flattened two-dimensional rendering of the virtual three-dimensional world as specified from camera view 111a, which may include three-dimensional camera positioning, lighting effects, and other rendering parameters. Alternatively, depending on the desired distribution of computing tasks, composite rendering device 130 may itself render the flattened two-dimensional rendering using virtual environment data 113a, rather than relying on virtual rendering system 110a to generate a pre-render.

Virtual rendering system 110b may operate in a similar manner as virtual rendering system 110a. Although virtual rendering system 110b may execute independently of virtual rendering system 110a, it may share similar datasets as virtual rendering system 110a, as composite rendering device 130 provides both simulation input data 112a and simulation input data 112b. For example, composite rendering device 130 may provide a shared input of three-dimensional coordinates and behaviors to determine movement paths for objects in simulation input data 112a and 112b, but each virtual rendering system might utilize a different set of objects or models during each respective simulation. This may be utilized, for example, to run a simulation of a football play, but with virtual rendering system 110a utilizing virtual players with college uniforms and virtual rendering system 110b utilizing virtual players with professional uniforms. Although each virtual rendering system runs independently with virtual objects of differing appearances, the virtual objects between the two virtual rendering systems may follow the same movement paths and have corresponding locations within virtual three-dimensional space.

Of course, each virtual rendering system could also run a completely different simulation, for example by simulating two different play strategies, or by using different virtual objects representing different teams. Moreover, simulations are not limited to sports entertainment applications and could focus on other purposes such as educational or informational applications. Additionally, although only two virtual rendering systems are shown in FIG. 1, alternative embodiments may use multiple virtual rendering systems to generate multi-layered views, present several different strategies concurrently, or to simulate other complex behaviors that would lend themselves to a multiple rendering system approach.

Video capturing system 120 may capture a real life environment, as opposed to the virtual environments of virtual rendering systems 110a-110b. The real life environment may include, for example, a person such as a talent personality or sports commentator to point out and explain the events occurring within the virtual simulations, enhancing the broadcast with augmented reality. In alternative embodiments, other objects could be captured by video capturing system 120, such as the sports match or another locale. Techniques such as blue screen or green screen technology might be utilized to isolate objects from background surroundings in the real life environment. In this manner, the talent personality can be isolated and cleanly inserted into broadcast footage.

Additionally, camera view 111b might be adjusted by composite rendering device 130 to zoom, pan, or implement other dynamic camerawork. To assist in these camera adjustments, a real-time location tracking system might be utilized, using technology such as a radio frequency identification (RFID) tag on the body of the talent, allowing video capturing system 120 to store positioning data within real environment data 123 such as the position of the talent in real space. In turn, composite rendering device 130 can use this positioning data to control camera view 121 or to help align a video capture stored in real environment data 123 with rendered virtual objects obtained from virtual rendering systems 110a-110b. If the real environment and the virtual environments both represent the same space, for example both representing a playing field, then camera view 121 might be synchronized to follow the movements of camera view 111a or camera view 111b.

After composite rendering device 130 receives virtual environment data 113a-113b and real environment data 123, processor 131 in communication with memory 134 for storing the object data from the received environmental data therein and to process and render into composite render 140. As shown in FIG. 1, processor 131 may utilize masking algorithm 132 and display priority algorithm 133 to resolve object priority between the object data when creating composite render 140. For example, masking algorithm 132 may be configured to hide particular objects, and display priority algorithm 133 may be configured to display particular objects in a defined order or to substitute for other objects. These determinations may be based from the data received from the environmental data, from absolute global rules, or from some combination of the two.

Once composite rendering device 130 determines object display priority to properly generate composite render 140, composite render 140 can then be sent over live broadcast link 145 to display 150. Live broadcast link 145 may comprise, for example, a satellite uplink to a television studio, from where it is disseminated to the general public. Display 150 may then represent, for example, a television of a viewer watching the broadcast. As previously discussed, the object data from the rendering and capturing sources may be updated continuously or periodically, allowing composite rendering device 130 to render composite render 140 continuously or periodically in turn, adjusted to standard broadcast video framerates or other convenient time periods. In this manner, multiple systems may be integrated in real-time to keep up with the demands of fast-paced event coverage such as live sports programs, but the system presented in FIG. 1 could also work for pre-recorded contents as well.

FIG. 2 presents a diagram of real and virtual environments for use by a system for integrating multiple virtual rendering systems to provide an augmented reality using the same camera view, according to one embodiment of the present invention. Diagram 200 of FIG. 2 includes virtual object data 213a-213b, real object data 223, composite rendering device 230, and composite render 240. Virtual object data 213a includes objects 214a-214c. Virtual object data 213b includes objects 214d-214f. Real object data 223 includes object 214g. Composite render 240 includes objects 214a and 214e-214g. With regards to FIG. 2, it should be noted that virtual object data 213a corresponds to a subset of virtual environment data 113a from FIG. 1, that virtual object data 213b corresponds to a subset of virtual environment data 113b, that real object data 223 corresponds to a subset of real environment data 123, that composite rendering device 230 corresponds to composite rendering device 130, and that composite render 240 corresponds to composite render 140.

As shown in FIG. 2, both virtual object data 213a and virtual object data 213b have virtual objects in corresponding positions, with the position of object 214a corresponding to object 214d, the position of object 214b corresponding to object 214e, and the position of object 214c corresponding to object 214f. As previously discussed, this situation may represent, for example, a virtual football team, with virtual object data 213a representing the virtual football team wearing college uniforms, and virtual object data 213b representing the virtual football team wearing professional uniforms. Both corresponding sets of virtual objects may be provided the same movement patterns by composite rendering device 230 or another master control device, moving synchronously to maintain position correspondence as each simulation progresses in time.

Additionally, data for real object data 223 may be provided to composite rendering device 230. The environment shown in real object data 223 may represent, for example, a television studio or a mobile production facility, with object 214g representing the talent that will be explaining virtual object data 213a-213b. As previously discussed, object 214g might be tracked using a RFID tag or another mechanism for determining the position of object 214g.

Once composite rendering device 230 receives data for objects 214a-214g, it may need to decide how to resolve object priority in the case of overlap or other conflicts. As previously discussed, this could be accomplished by using various masking or priority algorithms. As shown in composite render 240 of FIG. 2, a priority algorithm might decide that objects from virtual object data 213a have viewing precedence for objects to the left of the middle field divider, and that objects from virtual object data 213b have viewing precedence for objects to the right of the middle field divider. Thus, for the conflict between object 214a and 214d, object 214a is selected to display since it is located to the left of the middle field divider. Conversely, for the conflict between object 214b and 214e, object 214e is selected to display since it is located to the right of the middle field divider. The same logic can be applied to the conflict between object 214c and 214f to select object 214f for display.

Additionally, the position of object 214g within composite render 240 might be adjusted to avoid interference with other virtual objects, and a feedback display monitor may be provided at the site depicted in real object data 323 to assist the talent or announcer in accurately navigating the scene in relation to the movement of virtual objects onscreen. Once composite render 240 is sent to a suitable display, a viewer can observe the left side of the field having players wearing college uniforms, the right side of the field having players wearing professional uniforms, and a real life talent or announcer navigating the virtually created scene. Of course, the decision to divide the playing field into two different uniform types is arbitrary, and any number of layering or differentiating effects can be enabled using this multiple virtual rendering system integration technique. Moreover, it is not necessary to blend all virtual environments into one unified environment, since split screen displays, picture-in-picture (PIP) windows, and other methods of concurrently presenting multiple environments could be used as well.

FIG. 3 presents a diagram of real and virtual environments for use by a system for integrating multiple virtual rendering systems to provide an augmented reality using different camera views, according to one embodiment of the present invention. Diagram 300 of FIG. 3 includes virtual object data 313a-313b, real object data 323, composite rendering device 330, and composite render 340. Virtual object data 313a includes objects 314a-314c. Virtual object data 313b includes objects 314d-314e. Real object data 323 includes object 314g. Composite render 340 includes objects 314a, 314e, and 314g. With regards to FIG. 3, it should be noted that virtual object data 313a corresponds to a subset of virtual environment data 113a from FIG. 1, that virtual object data 313b corresponds to a subset of virtual environment data 113b, that real object data 323 corresponds to a subset of real environment data 123, that composite rendering device 330 corresponds to composite rendering device 130, and that composite render 340 corresponds to composite render 140.

FIG. 3 depicts a configuration where the objects of virtual object data 313a are viewed from a different camera view than the objects of virtual object data 313b. For example, virtual object data 313a might represent a camera view centering on the 20-yard line for one end-zone, whereas virtual object data 313b might represent a camera view centering on the 50-yard line. These different camera views can be used, for example, to show the tactics of the offense and defense simultaneously, or to focus on the sending and receiving sides of a pass, or to otherwise focus on multiple areas of the virtual field for illustrative or strategic analysis. As before in FIG. 2, a person is captured in real object data 323 as object 314g for providing analysis through augmented reality.

Since virtual object data 313a-313b use different camera views, it may make less sense to overlay them within composite render 340 as previously with FIG. 2 in composite render 240. Thus, as an alternative, a split screen view is utilized for composite render 340, where a zigzag line divides the left side for virtual object data 313a and the right side for virtual object data 313b. As previously discussed, a masking algorithm might be implemented to show only the left half of virtual object data 313a and the right half of virtual object data 313b, resulting in a composite image similar to composite render 340. Additionally, object 314g, the talent personality or commentator, is also rendered as well. Since both camera views provided by virtual object data 313a-313b are shown side by side, the talent personality can easily walk between both camera views, smoothly explaining the action from one view to another. Of course, a split screen implementation is only one method of showing concurrent camera views. Other methods, such as cascaded windows, tiled window grids, picture-in-picture, three-dimensional interfaces, and other methods may also be used to present multiple camera views to audience in an organized manner, easily navigable by the person represented by object 314g.

FIG. 4 shows a flowchart describing the steps, according to one embodiment of the present invention, by which a rendering device can render multiple virtual rendering systems in a displayable environment. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and network system 100 of FIG. 1, step 410 of flowchart 400 comprises composite rendering device 130 storing into memory 134 virtual environment 113a from virtual rendering system 110a using camera view 111a. Composite rendering device 130 may itself provide the parameters for camera view 111a, or camera view 111a might be provided by another device. As virtual rendering system 110a executes a simulation on the provided simulation input data 112a, which may originate from composite rendering device 130 as in FIG. 1 or from another device, virtual environment data 113a may be updated and provided to composite rendering device 130 at a periodic or continuous rate, which may be tied to a broadcast framerate or another metric. To physically transfer the data, direct connect cables, wireless data transfer, or networked communications may be utilized. After processor 131 receives the data, it may then write the data to memory 134 for future processing.

Referring to step 420 of flowchart 400 in FIG. 4 and network system 100 of FIG. 1, step 420 of flowchart 400 comprises composite rendering device 130 storing into memory 134 virtual environment data 113b from virtual rendering system 110b using camera view 111b. Step 420 may be carried out in a manner similar to step 410 above. As previously discussed, this method of integrating multiple virtual rendering systems could also be extended to more than two systems, for example by duplicating step 420 for as many additional virtual environments as needed.

Referring to step 430 of flowchart 400 in FIG. 4 and network system 100 of FIG. 1, step 430 of flowchart 400 comprises composite rendering device 130 storing into memory 134 real environment data 123 from video capturing system 120 using camera view 121. Step 430 may be carried out in a manner similar to steps 410-420, but with video capturing system 120 using video capture equipment to capture a real scene rather than recording a virtual simulation. As previously discussed, various techniques such as blue-screen or green-screen or real-time location tracking may be utilized to facilitate the creation of real environment data 123 for easy integration into composite render 140.

Referring to step 440 of flowchart 400 in FIG. 4 and network system 100 of FIG. 1, step 440 of flowchart 400 comprises composite rendering device 130 rendering composite render 140 by processing the environmental data stored in memory 134 from steps 410-430. As previously discussed, processor 131 of composite rendering device 130 may utilize masking algorithm 132 and display priority algorithm 133 to determine the priority and display or hide attributes for virtual and real objects, and may use various blending or juxtapositions to display one or several environments concurrently within composite render 140.

Referring to step 450 of flowchart 400 in FIG. 4 and network system 100 of FIG. 1, step 450 of flowchart 400 comprises composite rendering device 130 outputting composite render 140 to display 150. In FIG. 1, composite rendering device 130 uses live broadcast link 145 to transmit composite render 140 to display 150 for viewing by general audiences. As previously discussed, although the examples utilized have focused on a live broadcast embodiment, alternative embodiments may use composite render 140 for generating prerecorded contents as well.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for integrating multiple virtual rendering systems for outputting a composite render to a display, the method comprising:
   obtaining a first virtual environment data including first virtual objects from a first virtual rendering system using a first camera view;
   storing the first virtual environment data in a memory;
   obtaining a second virtual environment data including second virtual objects from a second virtual rendering system using a second camera view;
   obtaining real environment data from a video capture system, wherein the real environment data includes a real life talent personality;
   receiving positional data of the real life talent personality;
   adjusting the second camera view based on the positional data to obtain an updated second virtual environment data including the second virtual objects;
   storing the updated second virtual environment data in the memory;
   creating the composite render by combining the first virtual objects from the first virtual environment data and the second virtual objects from the updated second virtual environment data to provide a virtual scene, and by combining the real life talent personality navigating the virtual scene, wherein the creating applies a display priority algorithm when a position of one or more of the first virtual objects is similar to a position of one or more of the second virtual objects; and
   outputting the composite render to the display.

2. The method of claim 1, wherein the first camera view is the same as the second camera view.

3. The method of claim 1, wherein the first camera view is different from the second camera view.

4. The method of claim 1, wherein the rendering further applies a masking algorithm to hide the first virtual objects from the first virtual environment data or the second virtual objects from the updated second virtual environment data.

5. The method of claim 1, wherein the first virtual objects from the first virtual environment data and the second virtual objects from the updated second virtual environment data have corresponding locations.

6. The method of claim 5, wherein the first virtual rendering system and the second virtual rendering system use a shared input for determining a movement of the first virtual objects from the first virtual environment data and a movement of the second virtual objects from the updated second virtual environment data.

7. The method of claim 1 further comprising, prior to the rendering:
   storing the real environment data in the memory.

8. The method of claim 1, wherein the rendering adjusts a rendered position of the real life talent personality in the composite render to avoid interference with the first virtual objects from the first virtual environment and the second virtual objects from the second virtual environment.

9. The method of claim 1, wherein the video capturing system uses a same camera view as the first camera view.

10. The method of claim 1, wherein the rendering is continuous.

11. A rendering device for integrating multiple virtual rendering systems for outputting a composite render to a display, the rendering device comprising:

a memory;

a processor in communication with the memory, the processor being configured to:

obtain a first virtual environment data including first virtual objects from a first virtual rendering system using a first camera view;

store the first virtual environment data in the memory;

obtain a second virtual environment data including second virtual objects from a second virtual rendering system using a second camera view;

obtain real environment data from a video capture system, wherein the real environment includes a real life talent personality;

receive positional data of a real life talent personality;

adjust the second camera view based on the positional data to obtain an updated second virtual environment data including the second virtual objects;

store the updated second virtual environment data in the memory;

creating the composite render by combining the first virtual objects from the first virtual environment data and the second virtual objects from the updated second virtual environment data to provide a virtual scene, and by combining the real life talent personality navigating the virtual scene, wherein the creating applies a display priority algorithm when a position of one or more of the first virtual objects is similar to a position of one or more of the second virtual objects; and output the composite render to the display.

12. The rendering device of claim 11, wherein the first camera view is the same as the second camera view.

13. The rendering device of claim 11, wherein the first camera view is different from the second camera view.

14. The rendering device of claim 11, wherein the processor is further configured to apply a masking algorithm when rendering to hide the first virtual objects from the first virtual environment data or the second virtual objects from the updated second virtual environment data.

15. The rendering device of claim 11, wherein the first virtual objects from the first virtual environment data and the second virtual objects from the updated second virtual environment data have corresponding locations.

16. The rendering device of claim 15, wherein the first virtual rendering system and the second virtual rendering system use a shared input provided by the rendering device for determining a movement of the first virtual objects from the first virtual environment data and a movement of the objects from the second virtual updated second virtual environment data.

17. The rendering device of claim 11, wherein prior to the render the processor is further configured to:

store the real environment data in the memory.

18. The rendering device of claim 17, wherein the processor is further configured to adjust a rendered position of the real life personality in the composite render to avoid interference with the first virtual objects from the first virtual environment and the second virtual objects from the second virtual environment.

* * * * *